(12) United States Patent
Francos

(10) Patent No.: US 8,488,536 B2
(45) Date of Patent: Jul. 16, 2013

(54) MODE SELECTION FOR MIMO IN WIRELESS COMMUNICATION

(75) Inventor: Amir Francos, Tel-Aviv (IL)

(73) Assignee: Alvarion Ltd., Tel-Aviv (IL)

( * ) Notice: Subject to any disclaimer, the term of this patent is extended or adjusted under 35 U.S.C. 154(b) by 571 days.

(21) Appl. No.: 12/654,088

(22) Filed: Dec. 10, 2009

(65) Prior Publication Data

US 2010/0157925 A1 Jun. 24, 2010

Related U.S. Application Data

(60) Provisional application No. 61/193,638, filed on Dec. 11, 2008.

(51) Int. Cl.
| | |
|---|---|
| *H04J 1/16* | (2006.01) |
| *H04J 3/14* | (2006.01) |
| *H04L 1/00* | (2006.01) |
| *H04L 12/26* | (2006.01) |

(52) U.S. Cl.
USPC ......................................................... 370/329

(58) Field of Classification Search
None
See application file for complete search history.

(56) References Cited

U.S. PATENT DOCUMENTS

| | | | |
|---|---|---|---|
| 7,548,752 B2* | 6/2009 | Sampath et al. | 455/447 |
| 7,873,113 B2* | 1/2011 | Takano et al. | 375/267 |
| 2005/0201307 A1* | 9/2005 | Chae et al. | 370/310 |
| 2005/0213682 A1* | 9/2005 | Han et al. | 375/267 |
| 2008/0031314 A1* | 2/2008 | Priotti et al. | 375/227 |
| 2008/0227495 A1* | 9/2008 | Kotecha et al. | 455/562.1 |
| 2008/0298316 A1* | 12/2008 | Bitran et al. | 370/329 |
| 2009/0086837 A1* | 4/2009 | Teng et al. | 375/260 |
| 2009/0097583 A1* | 4/2009 | Shin et al. | 375/267 |
| 2009/0285325 A1* | 11/2009 | Zhou | 375/267 |
| 2010/0296591 A1* | 11/2010 | Xu et al. | 375/259 |
| 2011/0014885 A1* | 1/2011 | Fitch | 455/115.1 |

* cited by examiner

*Primary Examiner* — Hassan Phillips
*Assistant Examiner* — Prenell Jones

(57) ABSTRACT

A method for transmission mode selection in a MIMO radio system between a spatial diversity (A-matrix) mode and a spatial multiplexing (B-matrix) mode comprises: obtaining a channel condition number; if the channel condition number is above a selected threshold, and a signal to interference plus noise ratio exceeds a predetermined threshold then selecting spatial multiplexing; and otherwise selecting spatial diversity.

16 Claims, 9 Drawing Sheets
(2 of 9 Drawing Sheet(s) Filed in Color)

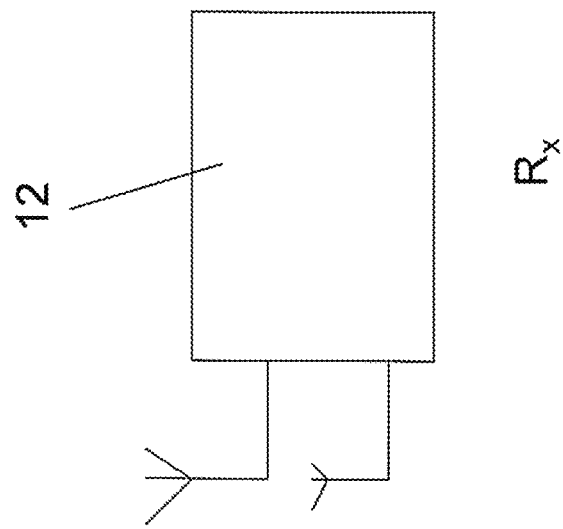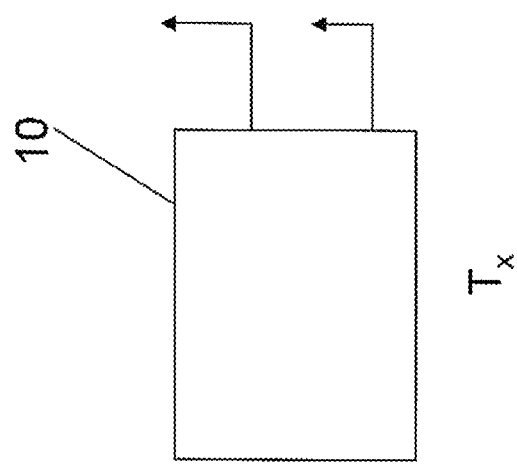
Fig. 1

MODE SELECTION FOR MIMO IN WIRELESS COMMUNICATION

FIELD AND BACKGROUND OF THE INVENTION

The present invention, in some embodiments thereof, relates to mode selection for MIMO in wireless communication and, more particularly, but not exclusively, to such mode selection carried out at a mobile station.

MIMO or multiple input multiple output, is a form of smart antenna technology for radio communication. Herein it is considered in relation to radio networks involving base stations and mobile stations, where typically the base station has multiple antennas, say up to four, and the mobile station has two antennas. In particular it is considered in relation to networks conforming to the IEEE 802.16 standard/WiMAX and/or 3GPP/LTE and/or 3GPP2/UMB that employ MIMO-OFDM signals in their downlink channel.

In a MIMO system, as shown in FIG. 1 a transmitter Tx 10 sends a signal using two antennas. The signal is received by two antennas at receiver Rx 12. The MIMO system is schematized in FIG. 2, in which a transmission source 14 sends multiple streams using multiple transmit antennas 1, 2 and 3. The transmit streams go through a matrix channel which consists of multiple paths between multiple transmit antennas at the transmitter 14 and multiple receive antennas 1, 2, and 3 at receiver 16. The receiver 16 obtains the received signal vectors from the multiple receive antennas and decodes the received signal vectors into the original information. The MIMO system may be modelled by an equation of the form:

$$y = Hx + n$$

where y and x are the receive and transmit vectors, respectively. In addition, H and n are the channel matrix and the noise vector, respectively.

Referring to information theory, the average capacity of a MIMO system is as follows:

Closed loop MIMO can achieve $$C_{CL} = E\left[\max_Q \log_2 \det(I + HQH^H)\right] = E[\log_2 \det(I + USU^H)]$$

where $UDV^H = svd(H)$ and $S = waterfilling(D^2)$. The functions of svd( ) and waterfilling( ) in turn represent singular value decomposition and power allocation by the water filling rule, respectively.

Open loop MIMO can achieve $$C_{OL} = \max_Q E[\log_2 \det(I + HQH^H)] = E[\log_2 \det(I + HH^H)]$$

since any unitary matrix of Q can achieve the capacity of an open-loop MIMO system, which is mostly $\min(N_t, N_r)$ times larger than that of a SISO system.

Currently IEEE 802.16e and the WimaX-Forum system profile mandate two MIMO schemes for data transmission. The first one is the Alamouti scheme (also know as matrix A) which tries to maximize the transmission diversity without increasing spectral efficiency. In other words Matrix A takes the advantage of the number of antennas and the different routes between the antennas to send a single signal, using spatial diversity to assist with decoding at the far end to overcome noise etc. The second mode is Spatial Multiplexing (SM) (also known as matrix B). Spatial Multiplexing splits or multiplexes the signal between the different channels so that each channel is transmitting a different part of the signal. Matrix B mode aims at doubling the transmission spectral efficiency in terms of bits/sub-carrier towards the said MS, by sacrificing diversity (i.e., Matrix B does not provide any diversity).

The question arises as to which of the above modes, Matrix A or Matrix B to select in any given multipath fading channel situation. In general matrix A is more efficient since the spatial diversity overcomes channel problems such as noise and interference. In low noise, low interference situations, however, spatial diversity has nothing to overcome, so that more data can be sent if Matrix B is used.

In general the process of MIMO mode selection for downlink transmissions is carried out at the mobile station (or hand-held device). However, the desired MIMO mode depends on the MIMO channel state as well as the interference environment seen at the receiver side. Thus a further question remains as to whether the task of MIMO mode selection should remain with the receiver side (MS) or move to the sender side (BS). In the WiMAX forum for example it was agreed that the MIMO mode selection is made at the MS side since it is attributed with better knowledge of the channel and interference level as perceived at its two receive antennas. Thus, a challenge is to provide an apparatus and method to enable MIMO mode selection at the MS side that takes into account the channel and instantaneous interference level. Such an apparatus may be applicable to base stations and to 802.16 systems. Although such a mode selection algorithm may be implemented at the mobile device side, it may be expected to have a major impact on the system and the BS performance, and in particular on the link adaptation process and scheduling process running at the BS side. Currently, MIMO mode selection is a mandatory feature at the WiMAX-Forum system profile and it may also be a mandatory feature in 802.16m and LTE.

Currently, the task of MIMO mode selection is an implementation specific algorithm carried out by the specific mobile station without the BS being aware of what the individual mobile station is doing, hence the current failure to deliver advantages to the network.

Current methods involve obtaining the channel conditions using pilot tones. A channel estimate is made using linear mean square error techniques (LMMSE) or maximum likelihood, of which the latter gives the better tradeoff.

Some recent proposals use the estimate of the MIMO channel matrix H (denoted as $\hat{H}$), and apply singular value decomposition (SVD) to the matrix $\hat{H}$ to obtain the channel singular values. Since in OFDM/OFDMA the signal consists of a sum of subcarriers, we actually refer to a MIMO channel per sub-carrier $\hat{H}_k$ where $\hat{H}_k$ has dimensions of M×N. M is the number of transmit antennas and N is the number of receive antennas.

Thus in practice we consider an ensemble $\{\hat{H}_k\}_{k=1}^K$ where K is the total available sub-carriers. In practice, cellular systems contain pilot tones that are introduced for the purpose of synchronization and estimation and data tones.

Hence mobile station receivers may choose to work on a reduced set of pilot tones only in order to simplify receiver implementation and thus the available ensemble is $\{\hat{H}_k\}_{k=1}^P$ where $P \subset K$.

Having $\{\hat{H}_k\}_{k=1}^{K}$ the receiver computes for each $\hat{H}_k$ its singular values and its condition number defined as $$\frac{\lambda_{min}}{\lambda_{max}}$$

where $\lambda_{min}$, $\lambda_{max}$ denote the minimal and maximal singular values. Matrix B is considered whenever the condition number is close to unity. As an example, we consider the WiMax standard that deals with 2×2 MIMO channels only. In this case per each subcarrier, $\hat{H}_k$ has a 2×2 dimension.

Per each $\hat{H}_k$ we perform singular value decomposition (SVD) defined as:

SVD($\hat{H}_k$)=USV where S is a diagonal matrix whose elements on the main diagonal are the singular values of $\hat{H}_k$. These singular values are the square root of the channel eigenvalues obtained from $\hat{H}_k^H\hat{H}_k$. Thus, eig($\hat{H}_k^H\hat{H}_k$)=[$\lambda_{1,k}^2$, $\lambda_{2,k}^2$] and on each tone the matrix S (for the case of MIMO 2×2) can be written as $$S = \begin{bmatrix} \lambda_{1,k} & 0 \\ 0 & \lambda_{2,k} \end{bmatrix}.$$

For each tone we compute its condition number denoted as $$\gamma_k = \frac{\lambda_{1,k}}{\lambda_{2,k}}.$$

The condition number has a one to one correspondence to the k-th tone MIMO channel rank. To summarize, the decision on a single stream (e.g., matrix A) or multi stream (e.g. Matrix B) is based on the broadband MIMO channel rank as computed by the mobile station. The condition number is an indication of the relative strengths of the channel Eigenvalues but it fails to take into account issues of interference and fading. That is to say, there may be considerable interference in the channel, regular fading etc. for which the A matrix is still required, but a selection based on the condition number fails to take these factors into account and tries to select the B matrix. Cellular systems are usually interference limited and this interference is spatially and temporally colored. As a consequence, MIMO mode decisions that are based on the channel's rank and statistics may lead to erroneous decisions and overall bad system performance.

The present embodiments seek to overcome the problems of opaque mobile station-based MIMO mode selection, and of inadvisable selection of the B matrix even under conditions of interference and channel fading.

SUMMARY OF THE INVENTION

The present embodiments begin with a closed form mathematical approach and associated formulas for MIMO mode selection, so that, although mode selection still remains with the mobile station, the BS knows exactly what criteria the MS is using to perform MIMO mode selection. As a result the link adaptation process can be optimized. To the above, the present embodiments add a criterion of thresholding a metric of the channel interference noise ratio, which is to be satisfied before the B matrix is selected. That is to say, a further criterion in addition to the MIMO channel rank criteria is added, which the mobile station may use in order to obtain a correct spatial mode decision.

According to a first aspect of the present invention there is provided a method for transmission mode selection in a MIMO radio system, the selection between a first mode of spatial diversity and a second mode of spatial multiplexing, the method comprising:

obtaining a channel condition number;

if the channel condition number is above a selected threshold, and a signal to interference plus noise ratio exceeds a predetermined threshold then selecting the mode of spatial multiplexing; and otherwise selecting the mode of spatial diversity.

Instead of the channel condition number, derivatives of the condition number or other mathematical constructs having the same effect could be substituted.

In an embodiment, the first mode is the matrix A mode, and the second mode is the matrix B mode.

In an embodiment, a channel condition number threshold of substantially 0.7 is provided.

In an embodiment, the channel signal to interference plus noise ratio comprises effective Carrier interference noise ratio (ECINR).

An embodiment may use EESM as a metric of the ECINR.

In an embodiment, the EESM metric is calculated from $$EESM = -\beta \ln\left[\frac{1}{N}\sum_{n=1}^{L}\sum_{k=1}^{N} e^{-\gamma_{k,n}/\beta}\right]$$

wherein L is the number of spatial streams at the mobile station (MS) side, N is the number of occupied subcarrier groups, $\gamma_{k,n}$ is the CINR per subcarrier group computed by the receiving station and β is a matching factor.

An alternative may use post-processing physical CINR as a metric of the ECINR.

Such a metric based on the post-processing physical CINR may be calculated $$\approx \frac{10}{\log 10}\frac{1}{NK}\sum_{k=1}^{K}\sum_{n=1}^{N}\log(\lambda_{n,k}) - \frac{10}{\log 10}\frac{1}{K}\sum_{k=1}^{K}\log(\sigma_k^2)$$

In an embodiment, the predetermined threshold is substantially 16 decibels.

The condition number may be a ratio of the smaller and the larger of channel singular values.

An embodiment may comprise obtaining a channel matrix prior to obtaining the condition number by using a pilot signal.

Such singular values may be obtained by calculating a singular value decomposition (SVD) of the channel matrix, to produce a diagonal matrix having two non-zero elements, the non-zero elements being the singular values.

According to a second aspect of the present invention there is provided apparatus for transmission mode selection in a MIMO radio system, the selection between a first mode of spatial diversity and a second mode of spatial multiplexing, the apparatus comprising:

a channel measurement and calculation unit for obtaining a broadband channel condition number;

and a mode selector associated with the channel measurement and calculation unit configured to either select the mode of spatial multiplexing if the broadband channel condition number is above a selected threshold 1, and a channel signal to interference plus noise ratio exceeds a predetermined threshold the selecting the mode of spatial multiplexing, or otherwise to select the mode of spatial diversity.

The apparatus may be incorporated into one member of the group comprising a mobile station, a relay station and a base station.

An embodiment may obtain a channel matrix prior to obtaining the condition number by using a pilot signal.

In an embodiment, the singular values are obtained by calculating a singular value decomposition (SVD) of the channel matrix, to produce a diagonal matrix having two non-zero elements, the non-zero elements being the singular values.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic diagram illustrating MIMO according to the prior art;

FIG. 2 is a schematic diagram illustrating the construction of a MIMO channel matrix;

FIG. 3 is a simplified flow chart illustrating MIMO mode selection according to a first embodiment of the present invention;

FIG. 4 is a simplified flow chart illustrating apparatus for carrying out the MIMO mode selection of FIG. 3;

FIG. 5 is a simplified flow chart illustrating the MIMO mode selection of FIG. 3 in greater detail;

FIG. 6 is a simplified eigenvalue distribution chart illustrating a scenario in which Matrix B may be chosen according to embodiments of the present invention;

FIG. 7 is a simplified eigenvalue distribution chart illustrating a scenario in which Matrix A may be chosen according to a preferred embodiment of the invention; and FIG. 8 is a graph showing simulation results with matrix B and indicating a suggested threshold for matrix B selection according to embodiments of the present invention.

FIG. 9 is a graph illustrating a simulation in which different modulation coding schemes are used with Matrix A encoding.

DESCRIPTION OF EMBODIMENTS OF THE INVENTION

The present invention, in some embodiments thereof, relates to mode selection for MIMO in wireless communication and, more particularly, but not exclusively, to such mode selection carried out at a mobile station.

The mode selection may be between a first mode of spatial diversity and a second mode of spatial multiplexing, for example the methods known as matrix A and matrix B respectively.

The mode selection may be made by obtaining the channel condition number and determining whether it is close to unity, as per the prior art. Then, if the condition number is close to unity then a CINR metric, which may be computed at the mobile station receiver, is compared to a threshold. If the threshold is exceeded then Matrix B is chosen. Otherwise matrix A is chosen.

Typical thresholds for CINR are 14, 15 or 16 dB. Any suitable metric may be used for obtaining CINR, as will be discussed in greater detail hereinbelow.

The present embodiments may provide a closed-form mathematical approach and associated formulas for MIMO mode selection, so that, although mode selection still remains with the mobile station, the BS knows exactly what criteria the MS uses to perform MIMO mode selection. As a result the link adaptation process can be optimized. Upon estimating the suitable MIMO mode, the mobile station feeds back its selection over a dedicated channel. For example, in IEEE802.16e the mobile unit feeds back its MIMO mode selection over the CQI channel which is part of the UL control channels available for the mobile. The transmitter, upon receiving the MIMO feedback may reconfigure its MIMO transmission according to the mobile station decision to optimize the downlink transmission according to multipath channel and interference conditions.

Such a method is suited to cellular and wireless data transmissions as constituted by various standards like 802.11n, LTE, 3GPP etc.

Figure 2:
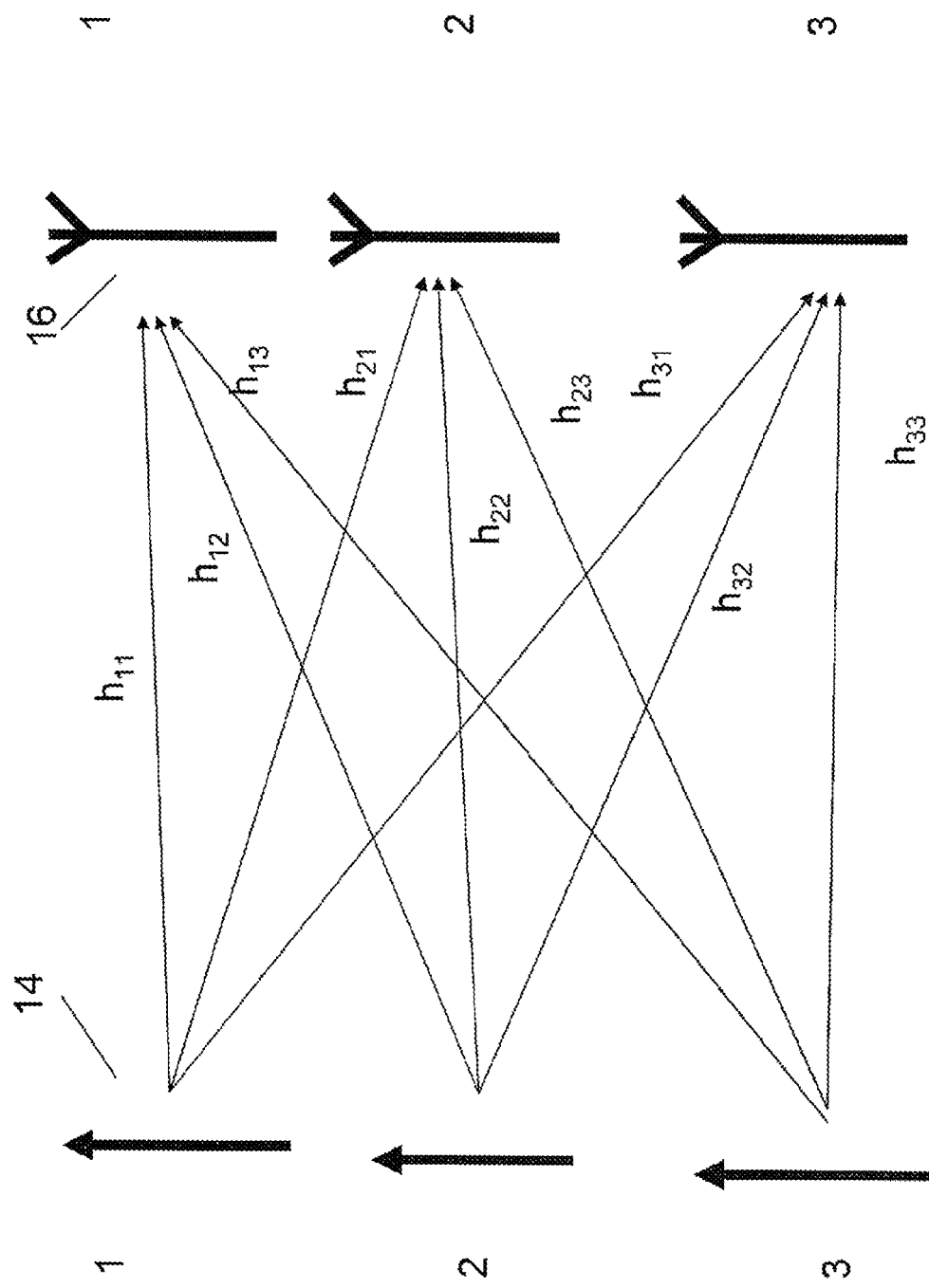

For purposes of better understanding some embodiments of the present invention, as illustrated in FIGS. 3-9 of the drawings, reference has already been made in the background to the construction and operation of a conventional MIMO system as illustrated in FIGS. 1 and 2. FIG. 1 is a simple schematic drawing of MIMO showing a transmitter device 10 having two antennas, and a receiver 12 having two receivers. Each transmitter may transmit to either or both receivers.

FIG. 2 shows the construction of an H matrix from the case where there are three transmitters and three receivers. Each transmitter sends a pilot signal to each receiver, and this is used to provide a channel estimate for each transmitter receiver combination, using MMSE or maximum likelihood estimation. The estimates form the values at corresponding entries in the matrix.

The H matrix can be manipulated to obtain the channel singular values, and, particularly in the case of the 2×2 matrix, the singular values can be obtained directly while being computationally efficient from singular value decomposition. The ratio of the singular values provides the condition number. A ratio close to one (also called rank-2 channel) indicates that the separate channels are of equal quality so that transmission by multiplexing between two independent channels is an option. A ratio far from one indicates that the channel has effectively one eigenvector and one degree of freedom (also called rank-1 channel) and thus the BS should transmit only one spatial stream (e.g., matrix A) on the eigenvector corresponding to the strongest eigenvalue.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3:
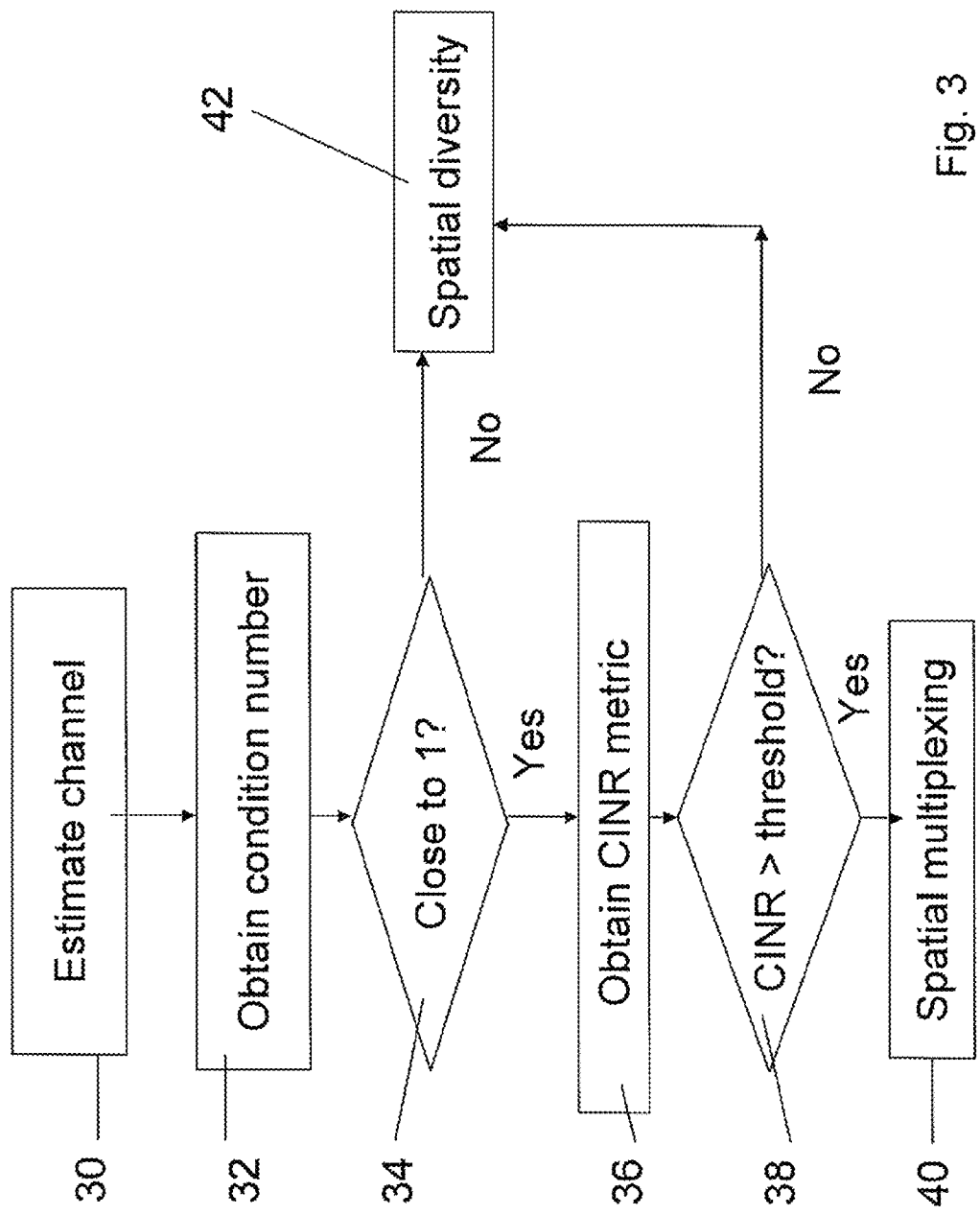

In the following, CINR denotes carrier to interference plus noise level. PCINR denotes physical CINR in decibels, and ECINR denotes effective CINR in terms of decibels Referring now to the drawings, FIG. 3 is a simplified diagram illustrating a MIMO mode selection operation in accordance with a first embodiment of the present invention. FIG. 1 illustrates a method for transmission mode selection in a MIMO radio system between a first mode of spatial diversity and a second mode of spatial multiplexing.

A channel estimate is obtained 30 as explained above.

A channel condition number is obtained 32, for example using one of the techniques outlined above, in order to obtain the channel Eigenvalues. The condition number may then be calculated as a ratio between them. In box 34, the channel condition number is tested to see if it is close to 1.

If the condition number is close to one then a metric of channel interference to noise ratio is obtained 36. The metric is compared to a predetermined threshold in box 38 and if the threshold is exceeded—or for that matter equaled or exceeded—then the spatial multiplexing mode is selected in box 40. In any other case box 42 is reached and the mode of spatial diversity is selected.

The spatial diversity mode may be the matrix A mode or Alamouti scheme. The spatial multiplexing mode may be the matrix B mode, for example as defined by the IEEE 802.16e and WiMAX-Forum system profile.

Regarding closeness to 1, a channel condition number diverging from 1 by up to 0.2 may still considered close to 1 in some embodiments. Other embodiments may expect smaller divergences, say 0.1.

The signal to interference plus noise ratio may be the effective Carrier interference noise ratio (ECINR), and EESM is a useful metric for ECINR.

The EESM metric may be calculated from $$EESM = -\beta \ln\left[\frac{1}{N}\sum_{n=1}^{L}\sum_{k=1}^{N} e^{-\phi_{k,n}/\beta}\right]$$

wherein L is the number of spatial streams as seen in the receiver side, N is the number of occupied subcarriers, $\phi_{k,n}$ is the CINR per tone computed by the MS, and $\beta$ is a matching factor.

In place of EESM, however, the post-processing physical CINR (PCINR) may be used as a metric of the channel interference to noise ratio.

The predetermined threshold may typically be 16 decibels, although 15 or 14 decibels may also be used in some cases.

As mentioned, the condition number is a ratio of channel singular values.

As explained above, the singular values can be obtained by calculating a singular value decomposition (SVD) of the channel matrix, to produce a diagonal matrix having two non-zero elements, in the typical 2×2 case. These two non-zero elements are the singular values being sought.

Example Operation

In order to demonstrate the algorithm operation we consider one possible MIMO mode selection at the MS side when the modulation method is OFDM/OFDMA. Let us assume that the OFDM/OFDMA signal contains $N_c$ subcarriers and the MIMO channel seen on every sub-carrier is 2×2 and is denoted by $H_k$. The received signal model per sub-carrier can be thus written as $r_k = H_k x_k + \tilde{N}_k$ where $r_k$ is the received signal on sub-carrier k, $H_k$ is the MIMO channel matrix with dimensions M×N and $\tilde{N}_k$ is the noise+interference component (with size N). Thus, in the first stage per each allocated subcarrier the mobile station performs the following:

1. Per each $\hat{H}_k$ (where $\hat{H}_k$ is the per subcarrier estimated channel as estimated by the mobile station) perform singular value decomposition, e.g., SVD($\hat{H}_k$)=USV where U and V are unitary matrices and S is a diagonal matrix whose elements on the diagonal are the MIMO channel singular values. These singular values will be denoted as $\lambda_{1,k}, \lambda_{2,k}$.
2. Per each sub-carrier compute the channel condition number defined as $$\gamma_k = \frac{\lambda_{1,k}}{\lambda_{2,k}}$$

3. Having the set $\{\gamma_k\}_{k=1}^{N_c}$, the MS computes the linear average $\bar{\gamma}=E[\gamma]$ where $\gamma$ is the vector of channel condition numbers (computed on each active allocated sub-carrier) to, capture the effect of the broadband channel and to obtain a single condition number that reflects the broadband channel's rank.
4. In the case in which MS has $N_{Ms}$ subcarriers where $N_{MS} < N_c$ then linear averaging is carried out over the set $\{\gamma_k\}_{n=1}^{N_{MS}}$.
5. In practice, MS may compute the broadband channel rank from a reduced set of pilot tones only while ignoring MIMO channel of data zones. This for example happens in 802.16e standard in which the mobile station computes the MIMO channel's rank from MIMO zone pilots only. In the IEEE 802.16e standard a zone is defined as a number of contiguous symbols in the downlink sub-frame or uplink subframe that use the same permutation formula and describe a base station functionality such as MIMO or Beamforming. The Permutation formula describes the structure and configuration of the data subcarriers and pilot subcarriers.

6. In another possible embodiment, the MS may compute the condition number not per a single sub-carrier but from a chunk of several contiguous subcarriers and compute a single number which reflects the condition number for all the subcarriers in that chunk. For example, in the downlink channel of 802.16e the MS may compute a condition number per cluster (defined as a chunk of 14 continuous subcarriers)

With respect to step 2, it should be noted that the maximal channel rank is two, due to the fact that practical mobile station implementations contain two receive antennas only. Such a case is merely given as an example and the present embodiments are not restricted to rank 2 MIMO channel matrices.

With respect to step 6, MS can in one possible embodiment do a linear averaging on the condition number obtained from all available clusters to obtain the broadband MIMO channel rank. In another possible embodiment, the MS may obtain a majority vote on a subset of the available condition numbers pending their result or decide on some percentile of the clusters that have a condition number better than a given threshold. To demonstrate the above we resort to an example.

In the downlink channel of IEEE802.16e when working with Partial Usage SubCarrier (PUSC) permutation with a 10[MHz] channel bandwidth, there are 60 clusters available. Now assume that of these 60 clusters, 50 clusters have a condition number of 0.9 while the other 10 clusters have a condition number which is less than 0.5. In that case the MS may decide (based on the 50 clusters) that the MIMO channel rank is 2 while ignoring completely the "bad" clusters.

Figure 4:
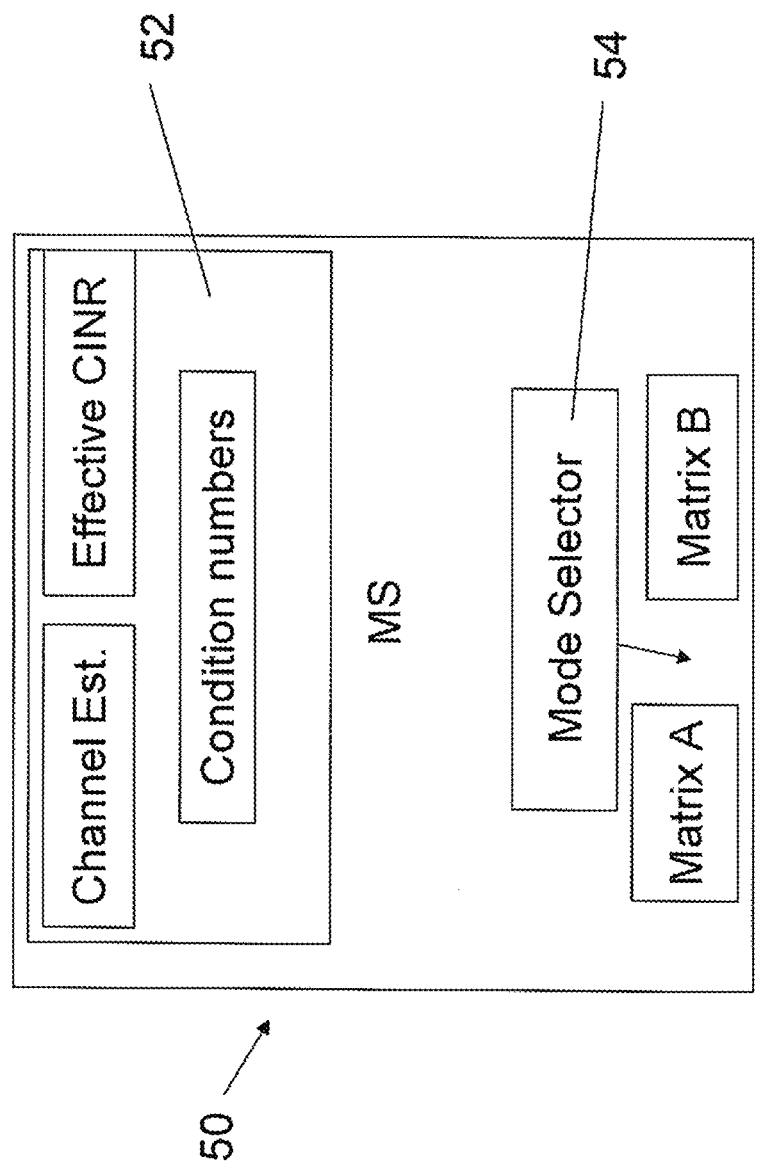

Reference is now made to FIG. 4, which is a simplified diagram showing apparatus for transmission mode selection in a MIMO radio system. As above the selection is between a first mode of spatial diversity and a second mode of spatial multiplexing. The apparatus 50 includes a channel measurement and calculation unit 52 which measures the channel, makes the necessary calculations and obtains a channel condition number and effective CINR. A mode selector 54 selects spatial multiplexing if the channel condition number is close to 1, and the channel interference to noise ratio exceeds a predetermined threshold. Otherwise the mode selector selects spatial diversity.

As explained, even if the apparatus selects the spatial multiplexing mode, the mode may still not be made available by the network. For example if the load is small, the network scheduler may only make the spatial diversity mode available. The apparatus is typically incorporated into a mobile station as explained in the background, although it may be incorporated into the base station or elsewhere in the network infrastructure.

Figure 5:
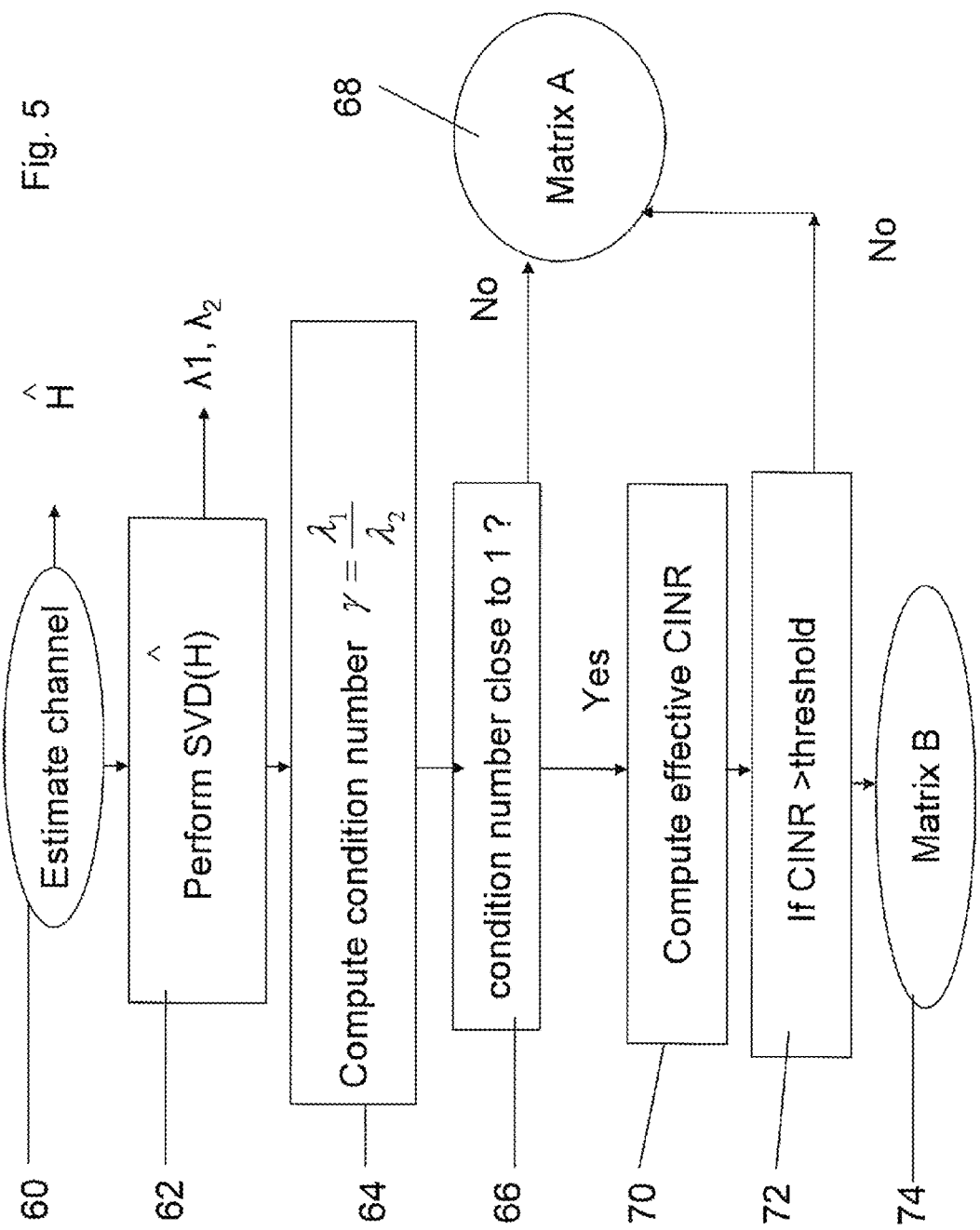

Reference is now made to FIG. 5, which shows the procedure of FIG. 3 in greater detail. The MS, in box 60, estimates per subcarrier the MIMO channel from the downlink (DL) pilots. As explained in respect of the prior art, the estimate may use a linear method, such as minimum mean square error MMSE. Alternatively, a maximum likelihood method may be used. The algorithm steps are as follows:

Box 62 involves performing $SVD(\hat{H}_k)$ where $\hat{H}_k$ is the estimated MIMO channel matrix per tone and SVD is the singular value decomposition of $\hat{H}_k$.

$SVD(\hat{H}_k)$ in turn is defined as follows:

$[U,S,V]=SVD(\hat{H}_k)$ produces a diagonal matrix S of the same dimension as, $\hat{H}_k$ with nonnegative diagonal elements in decreasing order, and unitary matrices U and V so that $\hat{H}_k=U*S*V'$. The maximal rank of the estimated channel matrix is 2, since the MS has two receive antennas. Hence S may have at most two non-negative diagonal elements which are the singular values of the estimated MIMO Channel matrix $\hat{H}_k$.

It is noted that for this reason also MIMO matrix B can be constructed with maximally two different spatial streams towards the given MS. Each stream carries exactly one half of the information payload intended for transmission for the said MS.

In a typical MIMO 2×2 scenario the numerical computation of $SVD(\hat{H}_k)$ at the MS side is mild.

In box 64, the algorithm computes the average broadband MIMO condition number by performing linear averaging or majority selection and averaging as explained above. This average condition number tells how strong the two estimated channel eigenvectors are. Transmission of MIMO matrix B is possible if these two eigen modes have nearly equivalent power (or amplitude), i.e. if $\bar{\gamma}>1-TH$, and TH is a small number (typically 0.1-0.2). The test of the condition number is carried out in box 66. If the test is failed then the procedure exists to 68 where Matrix A—spatial diversity, is used.

However, if the test is passed, then box 70 is entered and MIMO mode selection is performed according to the following pseudo-code:

If ($\bar{\gamma}>1-TH$), then compute a metric of Effective CINR or ECINR (for example EESM). As an alternative post processing physical CINR may be obtained from the per-tone CINR values as measured by the MS.

One possible metric for ECINR is EESM, which is defined as follows:

$$EESM = -\beta \ln\left[\frac{1}{N}\sum_{n=1}^{L}\sum_{k=1}^{N} e^{-\phi_{n,k}/\beta}\right]$$

Where L is the number of spatial streams as seen in the receiver side, N is the number of tones and β is an MS implementation specific matching factor. It may be assumed that L=2, although the present embodiments are not in any way so limited.

In box 72 the CINR calculated in box 70 is compared with a threshold. If the threshold is (equaled or) exceeded, then MIMO matrix B—spatial multiplexing—is selected in box 74. Otherwise matrix A is selected in box 68. More particularly the following criteria is checked:

If (EESM $\geq SNR\_th$)
   Choose matrix B
Else
   Choose matrix A
End

The above is based on the observation that MIMO matrix B requires High CINR and low interference environment to be more efficient than matrix A.

Upon estimating the desired MIMO mode, the mobile station reports its selection on a dedicated feedback channel. For example, in IEEE 802.16e the mobile station may report its preferred mode on the CQICH channel.

Figure 6:
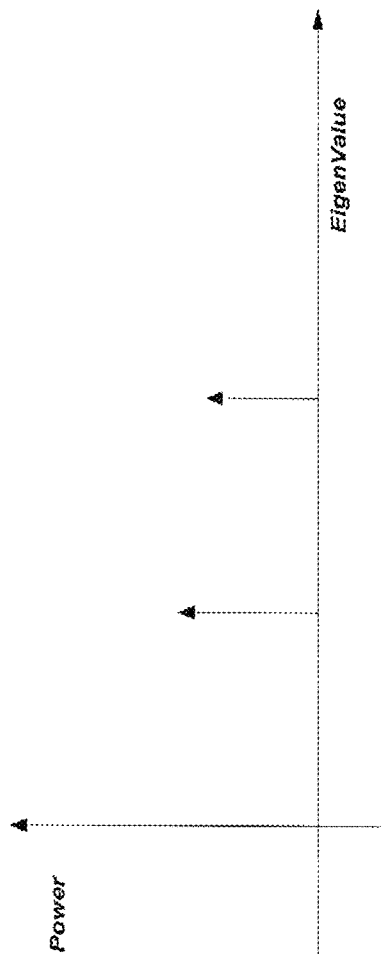

Reference is now made to FIG. 6 which is a graph of Eigenvalue distribution against power, where channel singular values are the square root of the channel eigenvalues. In FIG. 6 there are two Eigenvalues of approximately equivalent power. Such a possible scenario is one in which MIMO matrix B is a strong candidate for selection. Since the two eigenvalues have almost similar power, it is logical to transmit independent signals on the eigenvectors corresponding to these eigenvalues.

Figure 7:
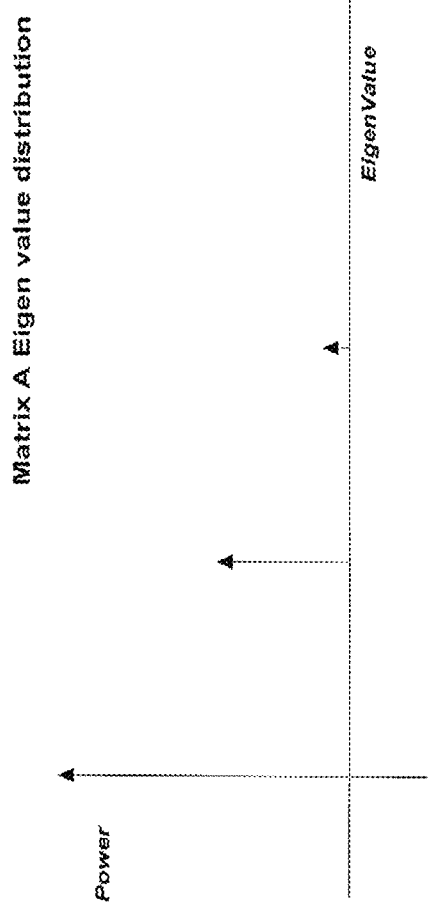

Reference is now made to FIG. 7. FIG. 7 again shows Eigenvalue distribution against power but this time one Eigenvalue is dominant. Therefore there is little point in transmitting two spatial streams. More specifically, independent transmission on the weak eigenvector that corresponds to the weak Eigenvalue is pointless and more is to be gained by using the second channel for spatial diversity as per Matrix A.

Figure 8:
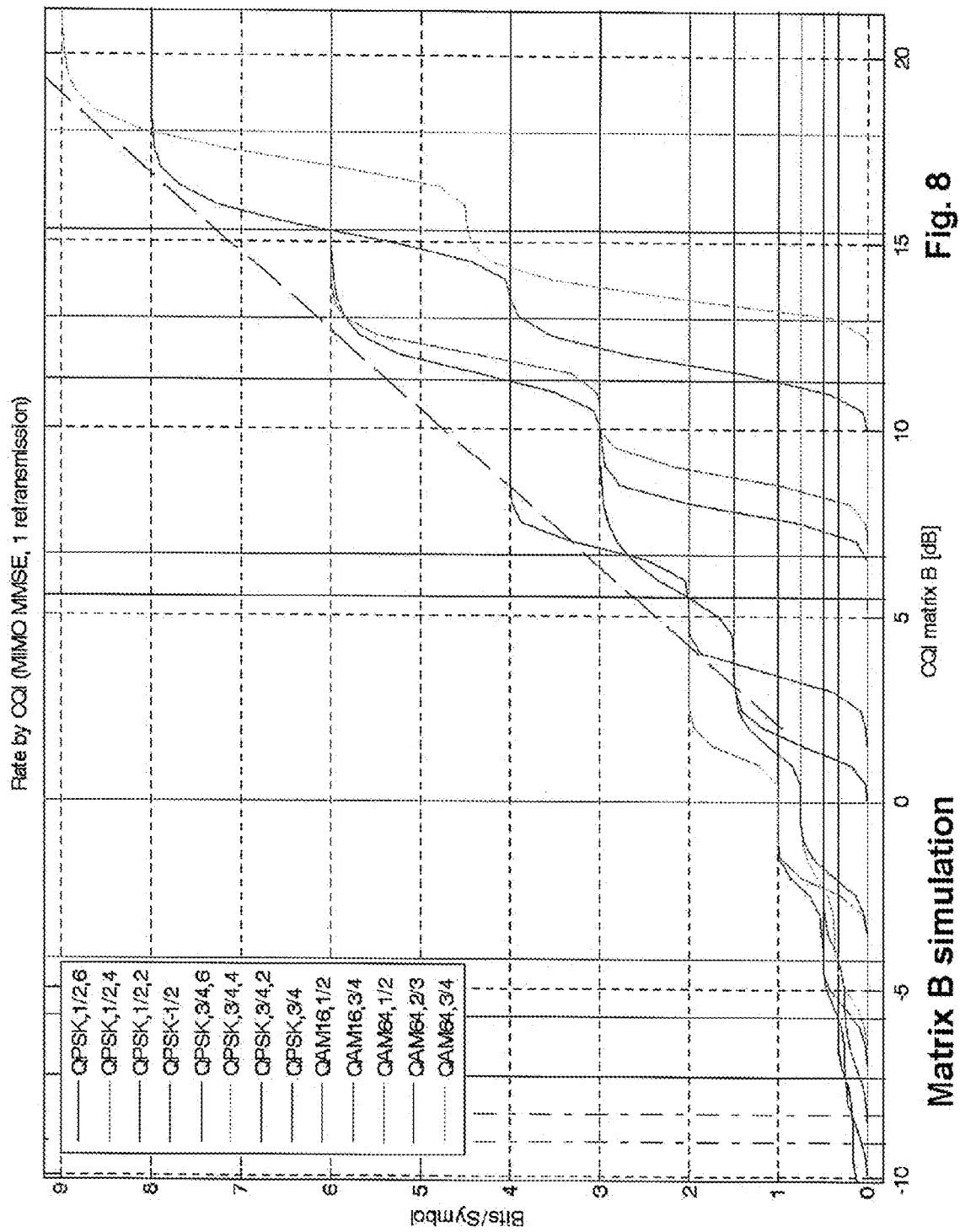
Figure 9:
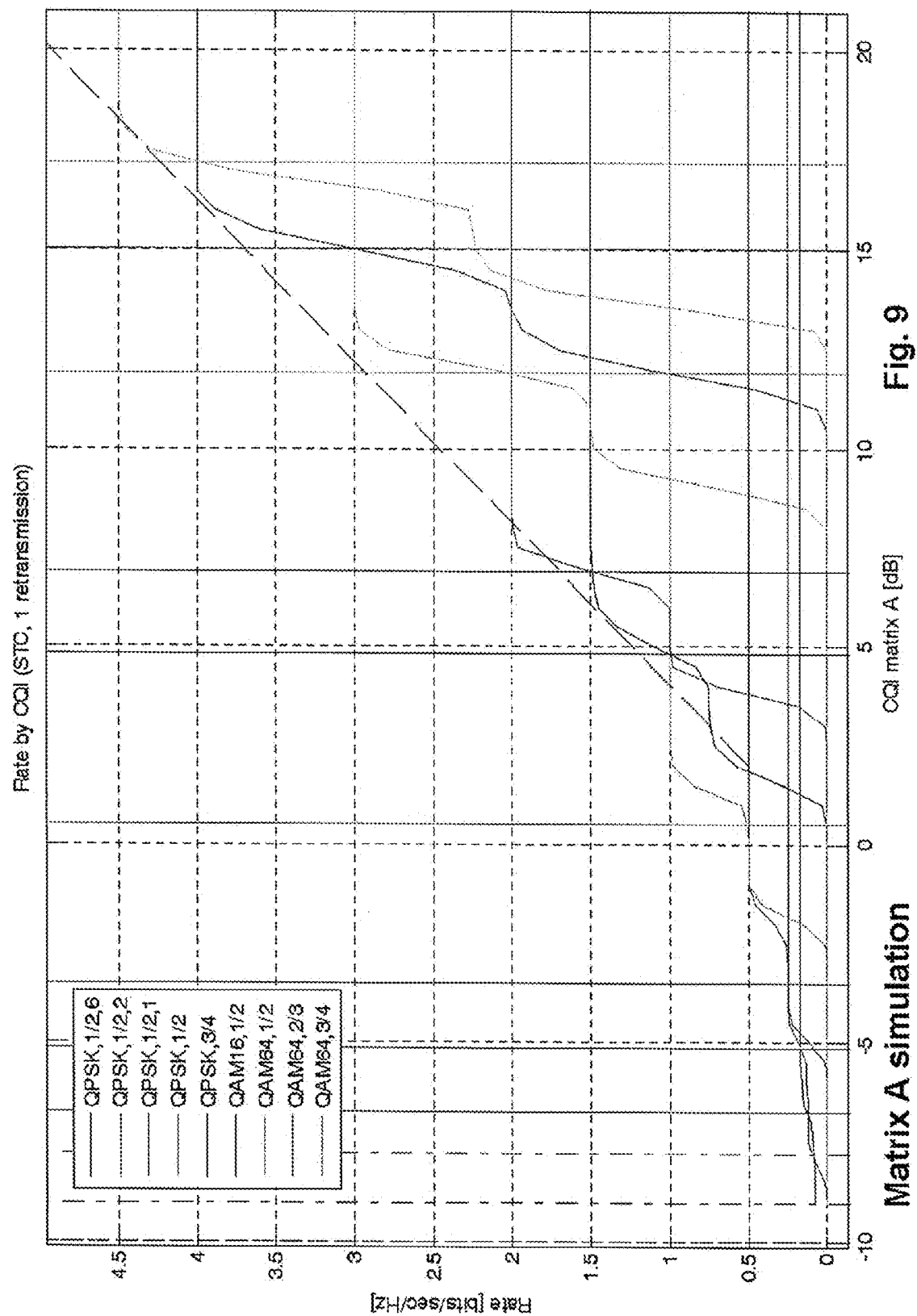

Reference is made to FIG. 8, which shows Rate vs. channel quality indicator (CQI) for MIMO matrix B with an MMSE receiver at the MS. Different graphs (color coded) show different constellations, but all using the B matrix. The system simulation results show that the required value for the SNR threshold for selecting matrix B is SNR_th≧16[dB].

More particularly we consider those constellations which manage to reach or exceed 8 bits per symbol, graph of QAM64 ⅔, indicated by reference numeral 80, and the graph of QAM64 ¾, indicated by line 82. Other constellations such as those indicated by reference numerals 84, 86 and 88 do not reach 8 bits per symbol. In both the constellations 80 and 82 there is a jump in the rate at around the 14-16 dB region, which actually involves a doubling of the bits per symbol. For example, considering graph 80, at ~16[dB] there is a jump from rate of 4[bits/symbol] to 8[bits/symbol], which is what makes the spatial multiplexing worthwhile. Vertical line 90 denotes this threshold for constellation 80. Vertical line 92 denotes the threshold for constellation 82. Vertical line 94 denotes the threshold for constellation 84. Vertical line 96 denotes the threshold for constellation 86. Vertical line 88 denotes the threshold for constellation 88. The thresholds are used by the link adaptation algorithm running at the BS in order to switch matrices for the given encoding.

Exponential Effective SINR Mapping (EESM) is post-processing effective CINR measurement, and more particularly is a method to estimate demodulator performance in a channel with frequency selective signal and/or noise. In a sense, the EESM is a channel-dependent function that maps power level and MCS level to SINR values in the Additive White Gaussian Noise (AWGN) channel domain. The EESM method has been shown to yield an accurate estimation of the AWGN-equivalent SINR for frequency selective channels. It should be noted that calculation of the CINR per tone requires a-priori knowledge of the MIMO mode since different MIMO modes have different CINR per tone metrics. In the following we suggest a few possible implementations for these metrics.

In the presently contemplated embodiments Nant is normally 2.

In general EESM can be written in its most generic form as:

$$SINR_{eff} = \Phi^{-1}\left\{\frac{1}{N}\sum_{n=1}^{N}\Phi(SINR_n)\right\}$$

where N is the number of coded symbols in the block and Φ is an invertible function. In this form $SINR_{eff}$ has the meaning of rate or modulation and coding scheme (MCS) identifier (e.g., 16 QAM r=½ or 64 QAM r=⅚).

For the purpose of OFDM/OFDMA the first equation for EESM above is suggested. In this sense this equation serves as average SNR (over all allocated subcarriers) from which we can deduce, using AWGN packet error rate (PER) tables (obtained a priori) the expected PER over the frequency selective channel. For the purpose of the present embodiments, ECINR is the average CINR value over all allocated subcarriers (or a subset of them—e.g. pilot subcarriers only) that is used to lookup into the AWGN PER tables.

ECINR and PCINR are two different alternate metrics wherein ECINR provides a final rate (MCS) which the user may expect to obtain. PCINR is a CINR report in [dB].

However both ECINR and PCINR are post processing metrics.

EESM is one possible method for effective CINR calculations.

Other possible metrics for ECINR have recently become available, and among them we may cite mutual information effective CINR (MIESM) and its possible derivatives.

PCINR is a different metric, which defines CINR per tone also given some a-priori knowledge of the MIMO mode (e.g. Alamouti scheme or Spatial multiplexing) and the receiver type. If a-priori knowledge is missing than the MS may assume its spatial mode.

In the case of the Alamouti scheme, the structure of the Alamouti decoder determines that only one type of receiver, which is the optimal receiver, is mandated. For matrix B, there may be several implementations but without loss of generality we deal now with the optimal receiver which in this case is the maximum likelihood receiver.

One possible definition for average CINR was given in IEEE 802.16e standard as:

$$\text{Avg\_CINR}_k = e^{C_k(d_k, y_k | H_k)} - 1$$

where the subscript k defines that this is a per tone metric. The mutual information conditioned on the receiver's knowledge of the channel state information for matrix A is given by:

$$C_k(d_k, y_k | H_k) = \log_2\left(1 + \left\|R^{-\frac{1}{2}} H_k\right\|_F^2\right) \approx \log\left(1 + \frac{1}{\sigma_k^2}\|H_k\|_F^2\right)$$

where $H_k$, $R_k$ and $\sigma_k^2$ denote the MIMO channel matrix, the covariance matrix of noise plus interference and the variance of noise plus interference averaged across the receive antennas, respectively, on tone k.

Since we are interested on the average CINR over all allocated subcarriers, an averaging mechanism may be defined. The average CINR for a matrix A receiver is given by:

$$\text{Avg\_CINR}_{STTD}[dB] = \frac{1}{K}\sum_{k=1}^{K}(1 + \text{Avg\_CINR}_k)[dB]$$

$$= \frac{10}{\log 10}\frac{1}{K}\sum_{k=1}^{K}\log(1 + \text{Avg\_CINR}_k)$$

$$= \frac{10}{\log 10}\frac{1}{K}\sum_{k=1}^{K} C_k(d_k, y_k | H_k)$$

$$\approx \frac{10}{\log 10}\frac{1}{K}\sum_{k=1}^{K}\log\left(1 + \frac{1}{\sigma_k^2}\|H_k\|_F^2\right)$$

-continued $$= \frac{10}{\log 10} \frac{1}{K} \sum_{k=1}^{K} \log\left(1 + \frac{1}{\sigma_k^2} \text{trace}(H_k^H H_k)\right)$$

$$= \frac{10}{\log 10} \frac{1}{K} \sum_{k=1}^{K} \log\left(1 + \frac{\sum_{n=1}^{N_{Tx}} \lambda_{n,k}}{\sigma_k^2}\right)$$

$$\approx \frac{10}{\log 10} \frac{1}{K} \sum_{k=1}^{K} \log\left(\sum_{n=1}^{N_{Tx}} \lambda_{n,k}\right) -$$

$$\frac{10}{\log 10} \frac{1}{K} \sum_{k=1}^{K} \log(\sigma_k^2)$$

where $\lambda_{n,k}$ and $\sigma_k^2$ denote the nth eigenvalue of matrix $H_k^H H_k$ and the average over receive antennas variance of noise plus interference, respectively on tone k where K defines the number of tones.

For a receiver employing matrix B and maximum likelihood (ML) receiver the per tone mutual information is defined as:

$$C_k(d_k, y_k \mid H_k) = \frac{1}{N} \text{logdet}(I_N + H_k^H R_k^{-1} H_k)$$

And the average PCINR is given by:

$$\text{Avg\_CINR}_{VSM-ML}[\text{dB}] = \frac{1}{K} \sum_{k=1}^{K} (1 + \text{Avg\_CINR}_k)[\text{dB}]$$

$$= \frac{10}{\log 10} \frac{1}{K} \sum_{k=1}^{K} \log(1 + \text{Avg\_CINR}_k)$$

$$= \frac{10}{\log 10} \frac{1}{K} \sum_{k=1}^{K} C_k(d_k, y_k \mid H_k)$$

$$\approx \frac{10}{\log 10} \frac{1}{NK} \sum_{k=1}^{K} \text{logdet}\left(I + \frac{1}{\sigma_k^2} H_k^H H_k\right)$$

$$= \frac{10}{\log 10} \frac{1}{NK} \sum_{k=1}^{K} \sum_{n=1}^{N} \log\left(1 + \frac{\lambda_{n,k}}{\sigma_k^2}\right)$$

$$\approx \frac{10}{\log 10} \frac{1}{NK} \sum_{k=1}^{K} \sum_{n=1}^{N} \log(\lambda_{n,k}) -$$

$$\frac{10}{\log 10} \frac{1}{K} \sum_{k=1}^{K} \log(\sigma_k^2)$$

Another possible PCINR metric to compute the average mutual information may be obtained by defining:

$$C(d, y \mid H) = \frac{1}{K} \sum_{k=1}^{K} C_k(d_k, y_k \mid H_k)$$

and thus:

$$\text{Avg\_CINR}' = e^{C(d,y\mid H)} - 1 = e^{\frac{1}{K}\sum_{k=1}^{K} C_k(d_k, y_k \mid H_k)} - 1$$

which gives: Avg_CINR' + 1 = Avg_CINR

As one can see in both cases of PCINR and ECINR that are post processing metrics, CINR computation is carried out in a causal way. This means that the receiver computes the PCINR or ECINR metric based on a knowledge of the current matrix type. For example, the computing of the PCINR metric from this metric type in frame, n is in order to give a decision on the required MIMO mode selection for frame n+1 (assuming report delays and real-time issues are negligible). In order to clarify this we will resort to an example.

We assume that the MS has no a-priori knowledge of the required mode and thus it assumes its required spatial mode is the Alamouti scheme (matrix A). Thus on the first transmissions it may report the PCINR metric according to the Matrix A PCINR equation. According to the algorithm described above the MS decides on matrix B as the spatial MIMO recommended mode for the next frame if and only if both the average condition number $\bar{\gamma}$ is above the required threshold and PCINR (computed according to matrix A) is above threshold, otherwise it will recommend matrix A. This recommendation is transmitted to the BS over the dedicated feedback channel. Assuming zero feedback delays and assuming the BS accepts this recommendation and transmits, in the second frame, a transmission in spatial multiplexing, the MS may provide, in this second frame a CINR report according to matrix B. In this way the algorithm continues to work on a frame by frame basis.

Types of cellular radiotelephone transmitters and/or receivers intended to be within the scope of the present invention may include, but are not limited to, Code Division Multiple Access (CDMA), CDMA-2000 and wideband CDMA (WCDMA) cellular radiotelephone receivers for receiving spread spectrum signals, Global System for Mobile communication (GSM) cellular radiotelephone, General Packet Radio Service (GPRS), Extended GPRS (EGPRS), third generation cellular systems (3G), LTE and the like. For simplicity, although the scope of the invention is in no way limited in this respect, embodiments of the invention described below may be related to a CDMA family of cellular radiotelephone systems that may include CDMA, WCDMA, CDMA 2000 and the like. Alternatively, embodiments of the invention may well be implemented in wireless data communication networks such as those defined by the Institute for Electrical and Electronics Engineers (IEEE).

In the above, the mobile station has been the active mode selector, however the algorithm can be applied in the same way at any receiving station, including relay stations and base stations.

In the claims below the term "condition number" refers to any mathematical function that is derived from the condition number or gives the same result as the condition number.

It is expected that during the life of a patent maturing from this application MIMO technology will continue to develop and the scope of the term MIMO is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for transmission mode selection in a MIMO radio system, the selection between a first mode of spatial diversity and a second mode of spatial multiplexing, the method carried out using an electronic processor the method comprising:
    obtaining a channel condition number;
    if the channel condition number is above a selected threshold, and a signal to interference plus noise ratio exceeds a predetermined threshold then selecting the mode of spatial multiplexing; and
    otherwise selecting the mode of spatial diversity;
    wherein said channel signal to interference plus noise ratio comprises effective Carrier interference noise ratio (ECINR), the method further comprising using Exponential Effective SINR Mapping (EESM) as a metric of said ECINR wherein said EESM metric is calculated from $$EESM = -\beta \ln\left[\frac{1}{N}\sum_{n=1}^{L}\sum_{k=1}^{N} e^{-\gamma_{k,n}/\beta}\right]$$

wherein L is the number of spatial streams at the mobile station (MS) side, N is the number of occupied subcarrier groups, $\gamma_{k,n}$ is the CINR per subcarrier group computed by a receiving station and $\beta$ is a matching factor.

2. The method of claim 1, wherein the first mode is the matrix A mode, and the second mode is the matrix B mode.

3. The method of claim 1, wherein a channel condition number threshold is substantially 0.7.

4. A method for transmission mode selection in a MIMO radio system, the selection between a first mode of spatial diversity and a second mode of spatial multiplexing, the method being carried out on an electronic processor, the method comprising:
    obtaining a channel condition number;
    if the channel condition number is above a selected threshold, and a signal to interference plus noise ratio exceeds a predetermined threshold then selecting the mode of spatial multiplexing; and
    otherwise selecting the mode of spatial diversity, wherein said channel signal to interference plus noise ratio comprises effective Carrier interference noise ratio (ECINR), comprising using post-processing physical CINR as a metric of said ECINR, wherein said post-processing physical CINR is $$\approx \frac{10}{\log 10}\frac{1}{NK}\sum_{k=1}^{K}\sum_{n=1}^{N}\log(\lambda_{n,k}) - \frac{10}{\log 10}\frac{1}{K}\sum_{k=1}^{K}\log(\sigma_k^2).$$

5. The method of claim 1, wherein said predetermined threshold is substantially 16 decibels.

6. A method for transmission mode selection in a MIMO radio system, the selection between a first mode of spatial diversity and a second mode of spatial multiplexing, the method being carried out on an electronic processor, the method comprising:
    obtaining a channel condition number;
    if the channel condition number is above a selected threshold, and a signal to interference plus noise ratio exceeds a predetermined threshold then selecting the mode of spatial multiplexing; and
    otherwise selecting the mode of spatial diversity wherein said condition number is a ratio of respectively smaller and larger of channel singular values, the method comprising obtaining a channel matrix prior to obtaining said condition number by using a pilot signal, wherein said singular values are obtained by calculating a singular value decomposition (SVD) of said channel matrix, to produce a diagonal matrix having two non-zero elements, said non-zero elements being said singular values.

7. Apparatus for transmission mode selection in a MIMO radio system, the selection between a first mode of spatial diversity and a second mode of spatial multiplexing, the apparatus comprising:
    a channel measurement and calculation unit for obtaining a broadband channel condition number;
    and a mode selector associated with said channel measurement and calculation unit configured to either select the mode of spatial multiplexing if the broadband channel condition number is above a selected threshold 1, and a channel signal to interference plus noise ratio exceeds a predetermined threshold, or otherwise to select the mode of spatial diversity; wherein said channel signal to interference plus noise ratio comprises effective Carrier interference noise ratio (ECINR), the method further comprising using Exponential Effective SINR Mapping (EESM) as a metric of said ECINR wherein said EESM metric is calculated from $$EESM = -\beta \ln\left[\frac{1}{N}\sum_{n=1}^{L}\sum_{k=1}^{N} e^{-\gamma_{k,n}/\beta}\right]$$

wherein L is the number of spatial streams at the mobile station (MS) side, N is the number of occupied subcarrier groups, $\gamma_{k,n}$ is the CINR per subcarrier group computed by the receiving station and $\beta$ is a matching factor.

8. The apparatus of claim 7, incorporated into one member of a group comprising a mobile station, a relay station and a base station.

9. The apparatus of claim 7, wherein the first mode is the matrix A mode, and the second mode is the matrix B mode.

10. The apparatus of claim 7, wherein the selector is configured such that a channel condition number is above a selected threshold.

11. The apparatus of claim 7, configured to use post-processing physical CINR as a metric of said ECINR.

12. The apparatus of claim 11, wherein said post-processing physical CINR is $$\approx \frac{10}{\log 10} \frac{1}{NK} \sum_{k=1}^{K} \sum_{n=1}^{N} \log(\lambda_{n,k}) - \frac{10}{\log 10} \frac{1}{K} \sum_{k=1}^{K} \log(\sigma_k^2).$$

13. The apparatus of claim 7, wherein said predetermined threshold is substantially 16 decibels.

14. The apparatus of claim 7, wherein said condition number is a ratio of channel singular values.

15. The apparatus of claim 14, comprising obtaining a channel matrix prior to obtaining said condition number by using a pilot signal.

16. The apparatus of claim 15, wherein said singular values are obtained by calculating a singular value decomposition (SVD) of said channel matrix, to produce a diagonal matrix having two non-zero elements, said non-zero elements being said singular values.

* * * * *